June 18, 1929.   P. LEYBOLD   1,717,935
WINDING WORKS
Filed Aug. 7, 1926   2 Sheets-Sheet 1

Inventor:
Paul Leybold

Patented June 18, 1929.

1,717,935

UNITED STATES PATENT OFFICE.

PAUL LEYBOLD, OF GEISSLINGEN, GERMANY.

WINDING WORKS.

Application filed August 7, 1926, Serial No. 129,103, and in Germany October 29, 1924.

This invention relates to winding works including a freely falling mechanism, and more particularly to winding works for operating the gates or sluices of turbines.

Freely falling sluices are used, for instance, for shutting down water turbines in cases of emergency. Such is, for instance, the case, if the oil pressure governor fails to operate. Such sluices are operated by the free falling motion of the sluice gate, the weight of the latter forming the driving power therefor after the locking mechanism has been released.

The locking has so far been accomplished mostly by means of a disengageable coupling which is provided between the rack operating pinions and the driving motor. The coupling may for instance be disengaged by the free fall of an auxiliary weight which is released by a pawl mechanism by the aid of a releasing magnet.

The disadvantages of the known arrangements consist firstly, in the uncertainty which is present in disengaging a claw-coupling under load and secondly, in the necessity of again adjusting the pawl mechanism every time after it had been released. This invention now has for its object to devise a winding gear for such purposes, in which these disadvantages are avoided. According to this invention the sluice is operated by a planetary gear. Preferably, the planetary gear is provided with a two-part band brake which is inserted in such a manner into the winding gear, that it will act as a coupling and in addition to this, as a brake. For disengaging the coupling the brake will be operated and for engaging the coupling the brake is rendered inoperative.

Figure 1:
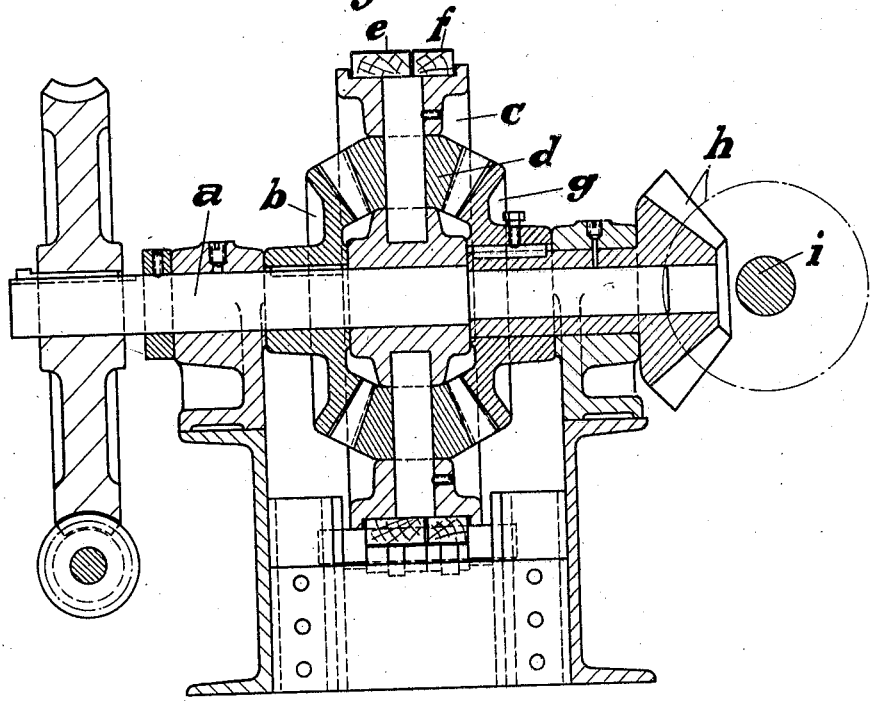
Figure 3:
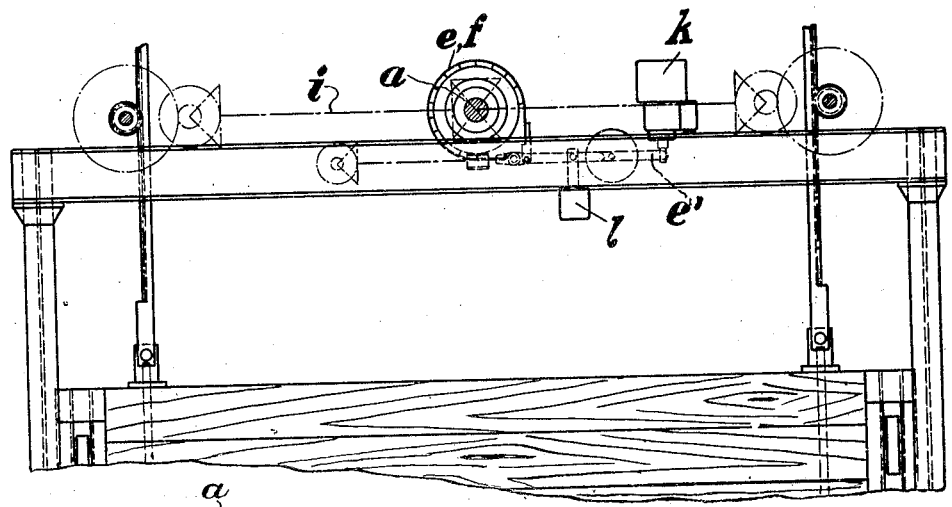
Figure 5:
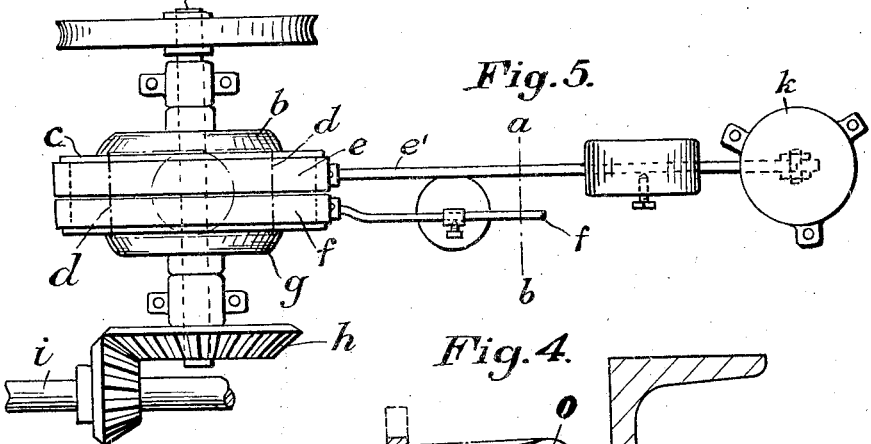
Figure 4:
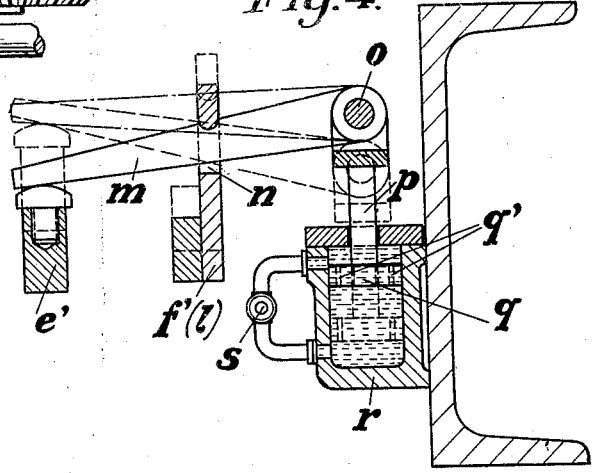

In the accompanying drawing I have represented an example of carrying this invention into effect, the construction as shown in the drawing comprising a planetary gearing consisting of bevel gear-wheels. Fig. 1 is a cross-section through the planetary gearing and the brake, Fig. 2 a view of the entire coupling together with the brake, Fig. 3 a view of the sluice operated by the winding gear according to this invention, and Fig. 4 is a section taken along the line A—B of Fig. 2 said section showing a device for accelerating the operation of the sluice.

If the sluice is in closed condition and if it is desired to open the sluice, the worm gear shaft $a$ which at the same time forms the shaft for the planetary gear, is driven by means of a motor or manually by way of the worm gear. By this the bevel gear $b$ which is keyed to the shaft $a$ will rotate. Since the drum $c$ of the brake, which is firmly connected with the axles of the planetary bevel gears $d$ is kept in fixed position by the band brake $e$ and $f$, the bevel gear $b$ will drive the bevel gear $g$ by way of the planetary gears $d$, said bevel gear $g$, therefore, being caused to rotate at even speed but in opposite sense of rotation. The rotation is transmitted by a pair of bevel gears $h$ to the connecting shaft $i$ and further by way of an intermediate gearing to the racks which serve for operating the sluice.

Figure 2:
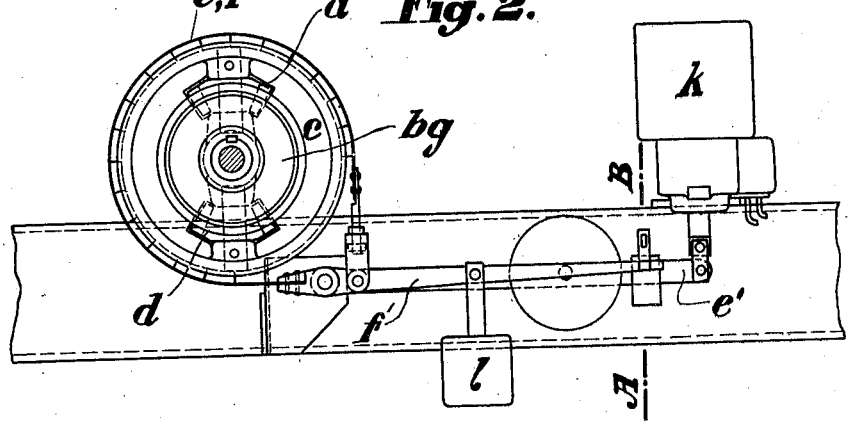

In this case, therefore, the planetary gear together with the two band-brakes will operate as a coupling. The same mode of operation in opposite sense of rotation will take place during normal closing of the sluice by operating the same from the motor side. It is noted that the smaller braking action of the plain band brake is not injurious during changing the direction of rotation on account of the slight resistance which is offered by the roller bearings, which are provided on the sluice gate, against the closing motion of the latter. If the sluice is intended to operate by its free falling action, which for instance may take place if the turbine should be in condition of racing, the main brake $e$ will be released by action of the releasing magnet $k$ which is shown in Fig. 2, said magnet being either automatically operated through a relay or by manual switching. By this the central part $c$ comprising the planetary gears will be driven by the bevel gear $g$ through the weight of the sluice gate and will roll off upon the bevel gear $b$, which at this time is in fixed condition, the worm gear forming a locking member therefor. The velocity of this motion is limited by an additional brake $f$. By adjusting the sliding-weight $l$ appertaining thereto the velocity of fall may be regulated. As the entire process takes place in a few seconds, there is no danger of the brake members being overheated.

The motion of the sluice gate in filled condition of the turbine chamber will be retarded in addition to this by the lifting power exerted through the wooden parts of the sluice gate, the friction existing between the gate and its bearing surfaces being only very slight on account of the rollers which are interposed therebetween. The sluice gate may also be brought to a stop in every other position if the releasing magnet is properly controlled. By this there will be given the possibility to have the mechanism come into play during normally shutting down the turbine. This has the advantage that the mechanism in case of emergency will work with a much greater degree of certainty than would be the case if it were left at standstill for a number of months, which may eventually cause the moving parts to stick to each other and prevent the proper operation.

The brake for the coupling will in addition to the aforedescribed operation also operate as a slip coupling. Slipping takes place as soon as the resistance which is offered by the sluice gate against the motion thereof will surpass the normal motor power for which the main brake had been adjusted. In this case, therefore, the brake-drum will slide relatively to the loaded brake-band. The mode of operation in this case is opposite to that which takes place during the free falling motion of the sluice. This feature of the device according to this invention is further utilized when the sluice gate reaches its end positions, in which case electrical end switches or the like will be dispensed with. The coupling and uncoupling is accomplished by raising or lowering a moderate weight without the necessity of overcoming frictions which cannot be well determined. Also the size of the releasing magnet will thereby be decreased.

It will not be necessary to again adjust the device according to this invention after it had been released, because the sluice again becomes ready for operation, as soon as the current ceases to flow through the releasing magnet.

The aforedescribed driving mechanism for the sluice is not always well suited for heavy sluices, because on account of the inertia of the masses and the presence of greater frictions the free falling motion will frequently commence too slowly. In consequence thereof there will be required too much time for closing the sluice, so that hunting of the turbine may take place. The danger of racing may be avoided by the arrangement which is shown in Fig. 2 in elevation and in Fig. 4 in a section. The main feature of this arrangement consists therein, that the two brakes are connected with each other by an intermediate member, which will release the additional brake if the main brake is released, and which is mounted yieldingly in such a manner that the action of the additional brake will increase with increasing velocity of the motion of the sluice.

The intermediate member $m$ will be lifted by the brake lever $e'$ which operates the main brake, and will carry with it the auxiliary brake $f'$ by the action of a coupling member, which is provided with a slot $n$ as shown in Fig. 4 of the drawing. The lever $m$ is mounted to rotate around a pivot $o$, said pivot being connected through the piston rod $p$ with a piston $q$. This piston $q$ moves within a cylinder $r$ which is filled with a liquid. The piston $q$ is provided with a number of narrow channels $q'$ through which the liquid may pass so that after operation of the lever $m$ the point of rotation $o$ may yield. The amount of this yielding motion of the pivot point $o$ may be regulated by providing a by-pass with a choke valve $s$ connecting the rear and front part of the cylinder $r$ with each other.

The operation during closing of the sluice will be as follows: In operative condition of the brakes the lever $m$ will be in the position which is shown in Fig. 4 in full-drawn lines, this position corresponding to the normal operation of the device. If the brake $e$ is released the lever $m$ will first come into the position which is indicated in dotted lines, this causing simultaneously the brake $f$ to be released. By action of the sliding-weight $l$ the lever $m$ will slowly press the piston $q$ downward until it will come into the lower dotted position which corresponds to the end of the free falling motion of the sluice. By properly adjusting the choke valve $s$, therefore, a further possibility will be given for regulating the velocity of the falling motion of the sluice, in addition to the adjustment of the sliding-weight $l$.

I claim:—

1. A device for driving sluices having a free falling motion, comprising a planetary gearing and a two-part brake operatively connected with said planetary gearing, a regulable weight for permanently controlling one part of said brake and a regulable releasing magnet for controlling the other part of said brake.

2. A driving mechanism for sluices of turbines or the like, comprising a driving shaft; a bevel-gear fast on said driving shaft; a second bevel-gear mounted co-axially with respect to said first bevel-gear and said driving shaft and rotatable independently therefrom; a connecting shaft operatively connected with said second bevel-gear and said sluice; a pair of planetary gears in engagement with said two bevel-gears; a brake-drum carrying said pair of planetary gears; a main brake and an additional brake, both associated with said drum, said main brake being adapted to be released in order to cause the free falling motion of said sluice; and said additional brake being adapted to retard the said free falling motion of said sluice, whereby said sluice may be raised and lowered by said shaft in operative condition of said main brake and only lowered by free falling motion of said sluice during release of said main brake.

3. A device for driving sluices having a free falling motion, comprising a planetary gearing and a two-part brake operatively connected with said planetary gearing, a regulable weight for permanently controlling one part of said brake and a regulable releasing magnet for controlling the other part of said brake, wherein the additional brake is equipped with an adjusting device adapted to retard the free falling motion of the sluice.

4. A device for driving sluices having a free falling motion, comprising a planetary gearing and a two-part brake operatively connected with said planetary gearing, a regulable weight for permanently controlling one part of said brake and a regulable releasing magnet for controlling the other part of said brake wherein the main brake and the additional brake are connected with each other by means of an intermediate member, said member being adapted to release said additional brake in dependence from the release of said main brake.

5. A driving mechanism for sluices of turbines or the like, comprising a driving shaft; a bevel-gear fast on said driving shaft; a second bevel-gear mounted co-axially with respect to said first bevel-gear and said driving shaft and rotatable independently therefrom; a connecting shaft operatively connected with said second bevel-gear and said sluice; a pair of planetary gears in engagement with said two bevel-gears; a brake-drum carrying said pair of planetary gears; a main brake and an additional brake, both associated with said drum; said main brake being adapted to be released in order to cause the free falling motion of said sluice; and said additional brake being adapted to retard the said free falling motion of said sluice, whereby said sluice may be raised and lowered by said driving shaft in operative condition of said main brake and only lowered by the free falling motion of said sluice during release of said main brake, wherein the main brake and the additional brake are connected with each other by means of an intermediate member, said member being adapted to release said additional brake in dependence from the release of said main brake, said intermediate member having a yieldingly mounted pivot and being associated with means for exerting a constantly acting force upon said pivot, so that the action of the additional brake will increase with increasing velocity of the free fall of the sluice.

In testimony whereof I have affixed my signature.

PAUL LEYBOLD.